Patented Feb. 12, 1935

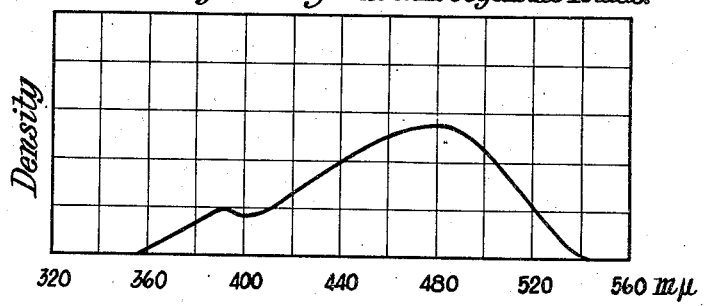
3,3'-Diethylselenazolinocarbocyanine Iodide.

1,990,682

UNITED STATES PATENT OFFICE 1,990,682

PHOTOGRAPHIC EMULSION CONTAINING SELENAZOLINOCARBOCYANINES

Frank L. White, Rochester, N. Y., assignor to Eastman Kodak Company, Rochester, N. Y., a corporation of New York Application September 21, 1931, Serial No. 564,137

10 Claims. (Cl. 95—7)

This invention relates to photographic emulsions and more particularly to gelatino-silverhalide emulsions containing a new class of photographic sensitizing dyes known as selenazolinocarbocyanines.

As ordinary photographic emulsions are generally indifferent to those colors of the spectrum of longer wave lengths, various types of sensitizing dyes have been suggested for incorporation in photographic emulsions or for employing over emulsions as overcoatings, so as to increase the spectral sensitiveness thereof. The new dyes described herein depart from the class of most of those previously suggested in that they contain selenium in the nuclei which are condensed to form the dye.

An object of the present invention is to provide a process for the preparation of these selenazolinocarbocyanine dyes and the incorporation of those dyes into photographic emulsions, as well as to provide the products resulting therefrom. Other objects will hereinafter appear, including the preparation of photographic elements from such emulsions.

I have discovered that the new base which is termed 2-methylselenazoline (after analogy to 2-methylthiazoline) gives rise to a new class of dyes which I prepare by the condensation of an alkyl quaternary salt of the base with an ortho-ester of a monobasic carboxylic acid. The reaction may be advantageously carried out in boiling dry pyridine. The ortho-esters of the carboxylic acids which I have found particularly suitable include as ortho-esters of the aliphatic carboxylic acids, such ortho-esters as, trimethyl or triethyl orthoformate, acetate, propionate, caproate, valerate and the like; as ortho-esters of the substituted aliphatic carboxylic acids, such esters as trimethyl or triethyl ortho-gamma-phenoxybutyrate and trimethyl or triethyl ortho-phenylacetate; and as ortho-esters of aromatic carboxylic acids such esters as trimethyl or triethyl orthobenzoate and trimethyl or triethyl ortho-ptoluate. Ortho-esters of substituted aromatic carboxylic acids may also be employed, such for example as where the aryl group (phenyl) is substituted by an alkyl group (methyl) or the like. The trimethyl and triethyl ortho-esters are illustrative and are not to be understood as limiting my invention to their use only. Instead of using trimethyl or triethyl orthoacetate I may employ methyldiethyl or dimethylethyl orthoacetate; instead of trimethyl or triethyl orthopropionate one may employ dimethylethyl or ethyl-di-n-propyl orthopropionate and instead of using trimethyl or triethyl ortho-n-caproate I may use methyldiethyl ortho-n-caproate, etc. In other words the alkoxy groups of the ortho-ester may be dissimilar, if desired, since the dye obtained will have the same structural formula whether the alkoxy groups are the same or different.

2-methylselenazoline has the following structural formula:

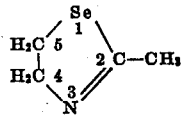

2-methylselenazoline may be prepared, I have found, as follows:

10.8 g. (1 mol.) of β-bromoethylamine hydrobromide are heated in a small round-bottomed flask on a steam bath. To this hot β-bromoethylamine hydrobromide there is added in small portions, over a period of about three minutes while it is stirred with a glass rod, 6.5 g. (1 mol.) of freshly prepared selenoacetamide. A melt is formed before all the selenoacetamide is added. The heating is continued for about five minutes, during which time the reaction mixture sets solid in the flask; this solid is chiefly the hydrobromide of 2-methylselenazoline. This solid is dissolved in 200 cc. water, made alkaline by the addition of 40% sodium hydroxide and the 2-methyl-selenazoline thus liberated distilled from this alkaline solution by steam distillation. About 50 cc. distillate is collected. Some of the 2-methylselenazoline separates as an oil and remains as the bottom layer. This layer is separated by means of a separatory funnel. The aqueous layer is then treated with pulverized potassium hydroxide whereupon more 2-methylselenazoline separates out, which is collected by extraction with ethyl ether. This ether extract is added to the 2-methylselenazoline which has previously been removed from the distillate at the separatory funnel and the whole is then dried with solid potassium carbonate. After decanting the anhydrous ethyl ether layer (containing the 2-methylselenazoline) from the potassium carbonate, the ether is then distilled off leaving 2-methylselenazoline as a residue which may be further purified by distilling under reduced pressure. The 2-methylselenazoline distills as a colorless liquid boiling at 71–72° C. at 35 mm. pressure of mercury.

When this 2-methylselenazoline is acted upon by a compound having a suitable acid radical such as methyl or ethyl iodide, there is produced the 2-methylselenazoline alkyl quaternary salt having the following structural formula for the methiodide:

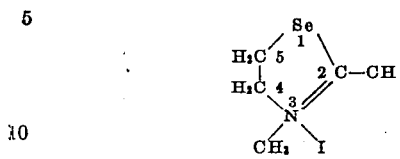

The ethiodide has an identical formula except that an ethyl group replaces the methyl group shown attached to the nitrogen. It will thus be noted that I employ a base which has a reactive methyl group in the 2-position.

When two molecular proportions of this 2-methylselenazoline alkyl quaternary salt are condensed in the presence of dry pyridine, for instance, with 1 molecular proportion of an ortho-ester of a monobasic carboxylic acid, such as those described above, for instance, ethyl orthoformate, there occurs the following probable reaction:

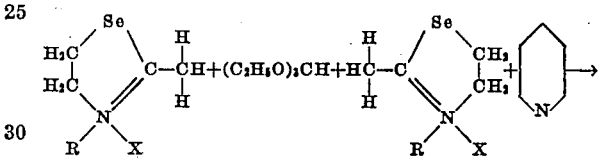

resulting in the formation of the dye shown. If a dye substituted in the 7-position is desired, one employs the proper ortho-ester, for instance, if one desired to have an ethyl group substituted for the hydrogen in the 7-position, one employs the ortho-ester of propionic acid. The reaction which occurs when for instance, triethyl orthoacetate or propionate is employed, is analogous to the reaction when ethyl orthoformate is employed and may be represented by the following reaction:

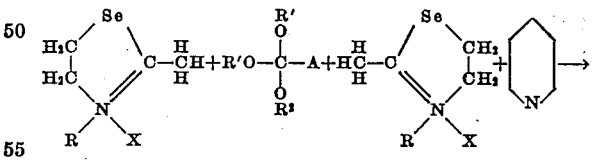

It will be noted from the above reactions that the dye formed has the same structural formula whether R' and R² are the same or dissimilar.

While the above reaction represents the formation of one of the preferred types of dyes, it is possible, as indicated above, to employ some other alkyl quaternary salt and thereby form a dye which has in the position X, an acid radical which it is desirable to replace by a more suitable acid radical. Thus, if I were to employ 2-methylselenazoline methosulphate or 2-methylselenazoline metho-p-toluenesulfonate as the alkyl quaternary salt, I would obtain respectively, the methosulphate or metho-p-toluene-sulfonate of the dye; by then treating either or both of these in solution with an aqueous solution of a salt containing a suitable acid radical I may convert the dye to a salt, other than the salt of formation; for instance, if I wished the iodide of the dye I would treat either the methosulphate, metho-p-toluenesulfonate or both in solution with an aqueous solution of potassium iodide.

In the above structural formula R, R' and R² represent alkyl groups such for instance as methyl or ethyl and X a suitable acid radical as before indicated.

As before pointed out, if I employ an ortho-ester of a carboxylic acid having more than one carbon atom there would result a dye in which A represents the substituent group introduced into the three carbon chain connecting the nuclei. This three carbon chain consists of three methenyl groups linked together as a trimethenyl chain having the structural formula:

=CH—CH=CH—

This chain links together the selenazoline nuclei. The substituted group A replaces the hydrogen of the central carbon atom of this trimethenyl chain.

The nomenclature and numbering of the above groups of compounds and intermediates are analogous to the usage and system of numbering employed in connection with the known thiazolinocarbocyanines. The numbering, of course, is arbitrary and is given for the guidance of those skilled in the art in order that there be no question as to the identity of the compounds covered by my invention.

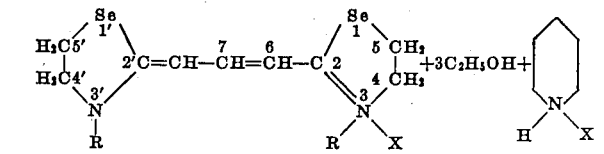

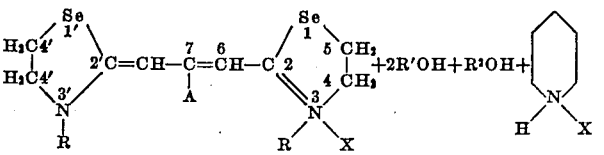

The following examples are typical of the manner in which my invention may be carried out, although it will be understood that these examples are intended to be merely illustrative and not to limit my invention in any way:

*Example 1*

*3:3'-diethylselenazolinocarbocyamine iodide.*— 3 g. (2 mols.) of 2-methylselenazoline were heated on a steam bath under reflux for several hours (for instance four hours) with 4.7 g. (2 mols. + 50% excess) of ethyl iodide. At the end of this period, during which the alkyl quaternary salt was formed, the condenser was disconnected and the excess of ethyl iodide allowed to evaporate. The dark alkyl quaternary salt was washed with three separate portions of acetone. After the last washing the last traces of acetone were removed by heating on the steam bath, care being taken to keep out as much moisture as possible. To this crude alkyl quaternary salt was added 25 cc. of dry pyridine and 3 cc. (in execess of 1 mol.) of ethyl orthoformate. This was quickly brought to a boil over a free flame under reflux with shaking and boiled gently for a period of time, such for instance as 45 minutes. Upon cooling (a freezing mixture may be used to advantage) crystals separated from this reaction mixture. The addition of acetone was found to increase the amount of crystals which separate. These crystals were then collected on a filter, washed with water followed by acetone and dried. They were then recrystallized from methyl alcohol. When the solution is quite cold it will be found advantageous to add a small amount of acetone to aid the crystallization of this dye. Crystals were collected on the filter, washed with acetone and dried. These crystals are orange color and a dilute methyl alcohol solution thereof has a bright yellow coloration.

Example 2

3:3'-*dimethyl-7-ethylselenazolinocarbocyanine iodide.*—1.85 g. (2 mols.) of 2-methylselenazoline were heated on a steam bath for a few hours, for instance three hours, under reflux with 2.9 g. (2 mols. + 60% excess) of methyl iodide. The reflux condenser was removed and the excess methyl iodide allowed to evaporate in the air. This crude alkyl quaternary salt was treated with 10 cc. of dry pyridine and 3 cc. (in excess of 1 mol.) of trimethyl orthopropionate. This was quickly brought to a boil over a free flame and gentle boiling continued for a period of time, for instance 45 minutes. Crystals separated from this reaction mixture after being cooled under refrigeration. These crystals were collected on a filter, washed and dried, then recrystallized from methyl alcohol. The addition of a small amount of acetone to the cold alcoholic solution gives a further precipitation of crystals of the dye. These were collected on a filter, washed with acetone and dried. Likewise these crystals are orange color; a dilute alcoholic solution thereof has a bright yellow coloration.

As indicated in the earlier portion of this specification, I may, instead of employing triethyl orthoformate or trimethyl orthopropionate, employ any of the ortho-esters of carboxylic acids set forth above or ones similar thereto. Thus, when ethyl orthoformate is employed, it will be apparent that I obtain a dyeunsubstituted in the 7-position, while with ortho-esters, the acid of which contains more than one carbon atom, I can obtain at will a dye in which there is substituted in the 7-position of the trimethenyl chain, either an alkyl group, a substituted alkyl group or an aryl or substituted aryl group. Thus, the letter A in the above structural formula indicates any of these groupings. As before indicated various alkyl groups may be employed in the portion indicated by the letter R to obtain different dyes of varying properties. The character X in the above formulae indicates any suitable acid radical such as a halide, p-toluene-sulfonate, alkylosulphate, nitrate, acetate, perchlorate or the like.

The emulsions described herein are sensitive to the blue and blue-green positions of the spectrum. The accompanying diagrammatic spectrogram illustrates, substantially, the intensity and range of sensitivity of emulsions containing selenazolinocarbocyanines. The particular emulsion illustrated contains 3,3'-diethylselenazolinocarbocyanine iodide. It will be noted that the maximum sensitivity is at about 480 millimicrons and that the sensitivity extends to about 530 millimicrons. It is interesting to note that the selenazolinocarbocyanines sensitize emulsions farther into the green than do the corresponding thiazolinocarbocyanines. For instance, in the case of 3,3'-diethylthiazolinocarbocyanine iodide, the maximum sensitivity is at about 470 millimicrons and the sensitivity extends to about 520 millimicrons.

In the preparation of emulsions containing my photographic sensitizers, it has been found that the dye may be dissolved in methyl alcohol and a volume of solution diluted with water and containing from 5 to 100 milligrams of dye added to 1000 cc. of emulsion, such, for instance, as the usual gelatino-silver-halide emulsion. While it may not be necessary to add some of the sensitizers in a large amount, it may be necessary to add others in amounts larger than those given above; generally about 10 to 20 milligrams is sufficient to obtain the maximum sensitizing effect with a dye having good sensitizing power. The more powerful dyes, however, may require much less. The regulation or adoption of the most economical proportions will be apparent to those skilled in the art upon observing the sensitizing power of the particular dye for the particular emulsion to be formed. The above examples are, therefore, illustrative and not to be understood as limiting the invention in any sense, as it will be apparent that these dyes may be incorporated by other methods in many of the photographic emulsions customarily employed in the art, such for instance as by bathing the plate or film, upon which the emulsion has been coated, in a solution of the dye in an appropriate solvent although this method of incorporating the dye in the emulsion is not preferred over that above described. Obviously the claims are all intended to cover any combination of these dyes with a photographic emulsion whereby the dye exerts a sensitizing effect upon the emulsions as well as a photographic element comprising a transparent support upon which the emulsion is coated or spread and permitted to dry.

What I claim as my invention and desire to secure by Letters Patent of the United States is:

1. A photographic gelatino-silver-halide emulsion containing a carbocyanine dye which contains two selenazoline nuclei.

2. A photographic gelatino-silver-halide emulsion containing a carbocyanine dye which contains two selenazoline nuclei linked together by a trimethenyl chain.

3. A photographic gelatino-silver-halide emulsion containing a 3:3'-dialkylselenazolinocarbocyanine salt.

4. A photographic gelatino-silver-halide emulsion containing a 3:3'-dimethylselenazolinocarbocyanine iodide.

5. A photographic gelatino-silver-halide emulsion containing a 3:3'-diethylselenazolinocarbocyanine iodide.

6. A photographic gelatino-silver-halide emulsion containing a carbocyanine dye of the following structure

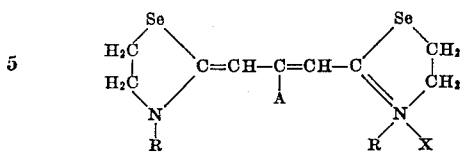

in which R equals alkyl, X equals an acid radical and A equals hydrogen, or an alkyl group.

7. A photographic gelatino-silver-halide emulsion containing a carbocyanine dye which contains two selenazoline nuclei linked together by a trimethenyl chain, the hydrogen of the central methenyl group of the trimethenyl chain being substituted by an alkyl group.

8. A photographic gelatino-silver-halide emulsion containing a 7-alkyl-selenazolinocarbocyanine.

9. A photographic gelatino-silver-halide emulsion containing a 3:3':7-trialkylselenazolinocarbocyanine salt.

10. A photographic element comprising a transparent support coated with a photographic gelatino-silver-halide emulsion containing a carbocyanine dye which contains two selenazoline nuclei linked together by a trimethenyl chain.

FRANK L. WHITE.